United States Patent
Levit et al.

(10) Patent No.: US 9,976,258 B2
(45) Date of Patent: May 22, 2018

(54) HONEYCOMB CORE HAVING A HIGH COMPRESSION STRENGTH

(71) Applicant: E I DU PONT DE NEMOURS AND COMPANY, Wilmington, DE (US)

(72) Inventors: Mikhail R Levit, Glen Allen, VA (US); Dariusz Wlodzimierz Kawka, Midlothian, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 254 days.

(21) Appl. No.: 14/818,456

(22) Filed: Aug. 5, 2015

(65) Prior Publication Data

US 2016/0097162 A1    Apr. 7, 2016

Related U.S. Application Data

(60) Provisional application No. 62/059,399, filed on Oct. 3, 2014.

(51) Int. Cl.
| | |
|---|---|
| *B32B 3/12* | (2006.01) |
| *D21H 19/84* | (2006.01) |
| *B32B 27/10* | (2006.01) |
| *D21H 13/26* | (2006.01) |
| *D21H 19/12* | (2006.01) |
| *D21H 23/70* | (2006.01) |
| *D21H 19/24* | (2006.01) |
| *D21H 19/30* | (2006.01) |
| *D21H 19/82* | (2006.01) |

(52) U.S. Cl.
CPC .......... *D21H 19/84* (2013.01); *B32B 3/12* (2013.01); *B32B 27/10* (2013.01); *D21H 13/26* (2013.01); *D21H 19/12* (2013.01); *D21H 19/24* (2013.01); *D21H 19/30* (2013.01); *D21H 19/824* (2013.01); *D21H 23/70* (2013.01); *B32B 2250/40* (2013.01); *B32B 2255/12* (2013.01); *B32B 2262/0269* (2013.01)

(58) Field of Classification Search
None
See application file for complete search history.

(56) References Cited

U.S. PATENT DOCUMENTS

| | | |
|---|---|---|
| 3,756,908 A | 9/1973 | DuPont |
| 4,698,267 A | 10/1987 | Tokarsky |
| (Continued) | | |

FOREIGN PATENT DOCUMENTS

| | | |
|---|---|---|
| WO | 2011/062980 A2 | 5/2011 |
| WO | WO2011027342 | 10/2011 |

OTHER PUBLICATIONS

International Search Report, dated Dec. 17, 2015, for international application No. PCT/US2015/052835, filed Sep. 29, 2015.

*Primary Examiner* — Nicholas W. Jordan

(57) ABSTRACT

A method of making a fiber-reinforced composite structure comprises the steps of (i) forming a paper sheet having a Gurley air resistance at least 200 seconds per 100 milliliters, the sheet comprising from 30 to 70 weight percent p-aramid fiber, (ii) depositing on both surfaces of the paper sheet a compression enhancing layer in a quantity up to 5 weight percent based on the weight of the paper, (iii) forming a honeycomb from the sheet of step (ii), and (iv) applying a matrix resin coating to the honeycomb of step (iii).

1 Claim, 3 Drawing Sheets

(56) References Cited

U.S. PATENT DOCUMENTS

| | | | |
|---|---|---|---|
| 4,729,921 A | 3/1988 | Tokarsky | |
| 4,968,560 A * | 11/1990 | Lechner | C08J 5/06 |
| | | | 428/378 |
| 5,026,456 A | 6/1991 | Hesler et al. | |
| 5,137,756 A | 8/1992 | Lin | |
| 5,137,768 A | 8/1992 | Lin | |
| 5,223,094 A | 6/1993 | Kirayoglu et al. | |
| 5,314,742 A | 5/1994 | Kirayoglu | |
| 5,474,842 A | 12/1995 | Hoiness | |
| 5,789,059 A | 8/1998 | Nomoto | |
| 6,800,351 B1 | 10/2004 | Pflug et al. | |
| 6,913,570 B2 | 7/2005 | Kehrle | |
| 6,935,997 B2 | 8/2005 | Kling | |
| 2010/0055384 A1 * | 3/2010 | Doecker | B32B 3/12 |
| | | | 428/113 |

\* cited by examiner

HONEYCOMB CORE HAVING A HIGH COMPRESSION STRENGTH

BACKGROUND OF THE INVENTION

Field of the Invention

This invention relates to a high compression strength honeycomb core and a method of making the core from a paper comprising p-aramid fiber and fibrids.

Description of Related Art

Core structures for sandwich panels from p-aramid fiber papers or wet-laid nonwovens, mostly in the form of honeycomb, are used in different applications but primarily in the aerospace industry where strength to weight or stiffness to weight ratios have very high values. Traditionally, such core structures have been optimized for maximum shear modulus (stiffness) of the core. For example, U.S. Pat. No. 5,137,768 to Lin describes a honeycomb core made from high-density paper comprising 50 weight percent or more of p-aramid fiber in the form of floc (cut fiber) with the rest of the composition being a binder and other additives.

In many cases, improved core shear properties have been achieved, without noticeable improvement in core compressive strength. In some instances, reduction in honeycomb core weight, while keeping the same or better shear properties, has led to some sacrifice in core compression strength. There is therefore an ongoing need for improved compression strength of honeycomb core based on p-aramid fiber paper.

BRIEF SUMMARY OF THE INVENTION

This invention pertains to a method of making a fiber-reinforced composite structure comprising the steps of:

(i) forming a paper sheet having a Gurley air resistance at least 200 seconds per 100 milliliters, the sheet comprising from 30 to 70 weight percent p-aramid fiber, (ii) depositing on both surfaces of the paper sheet a compression enhancing layer in a quantity up to 5 weight percent based on the weight of the paper, (iii) forming a honeycomb from the sheet of step (ii), and (iv) applying a matrix resin coating to the honeycomb of step (iii).

The invention also pertains to a honeycomb core comprising in order (i) a paper sheet, the sheet comprising meta-aramid fibrids, para-aramid fibrids or a combination thereof, (ii) a compression enhancing layer deposited onto at both outer surfaces of the paper sheet in a quantity up to 5 weight percent based on the weight of the paper, and (iii) a matrix resin coating resin coated onto the surface of the compression enhancing layer, wherein the matrix coating resin is phenolic, polyimide, polyetherimide, epoxy or combinations thereof.

DETAILED DESCRIPTION OF THE INVENTION

This invention pertains to a honeycomb core comprising a plurality of interconnected walls having surfaces that define a plurality of honeycomb cells, wherein the cell walls are formed from a paper which, prior to impregnation with a resin, comprises 30-70 parts by weight p-aramid fiber, and 30-70 parts by weight of aramid fibrids and has a Gurley air resistance of at least 200 seconds per 100 milliliters. Further the surface of the paper is modified by a coating, a compression enhancement layer, that subsequently contributes to providing improved compressive bond strength in a honeycomb structure.

More preferably, the cell walls are formed from a paper which, prior to impregnation with a resin, comprises 50-70 parts by weight p-aramid fiber, and 30-50 parts by weight of aramid fibrids, has a Gurley air resistance of at least 500 seconds per 100 milliliters.

A surprising synergistic effect has been found between the material of the compression enhancing layer and a paper optimized to have a Gurley air resistance of at least 200 seconds per 100 milliliters. Neither of these features, when taken alone contributes to enhanced compression strength but when combined, enhanced performance is observed. Gurley air resistance is a convenient measure of paper density (porosity). Also surprisingly, further improvement of compression strength of the honeycomb core was found to be associated with increasing the paper density above 0.8 g/cm$^3$.

Honeycomb

Figure 1A:
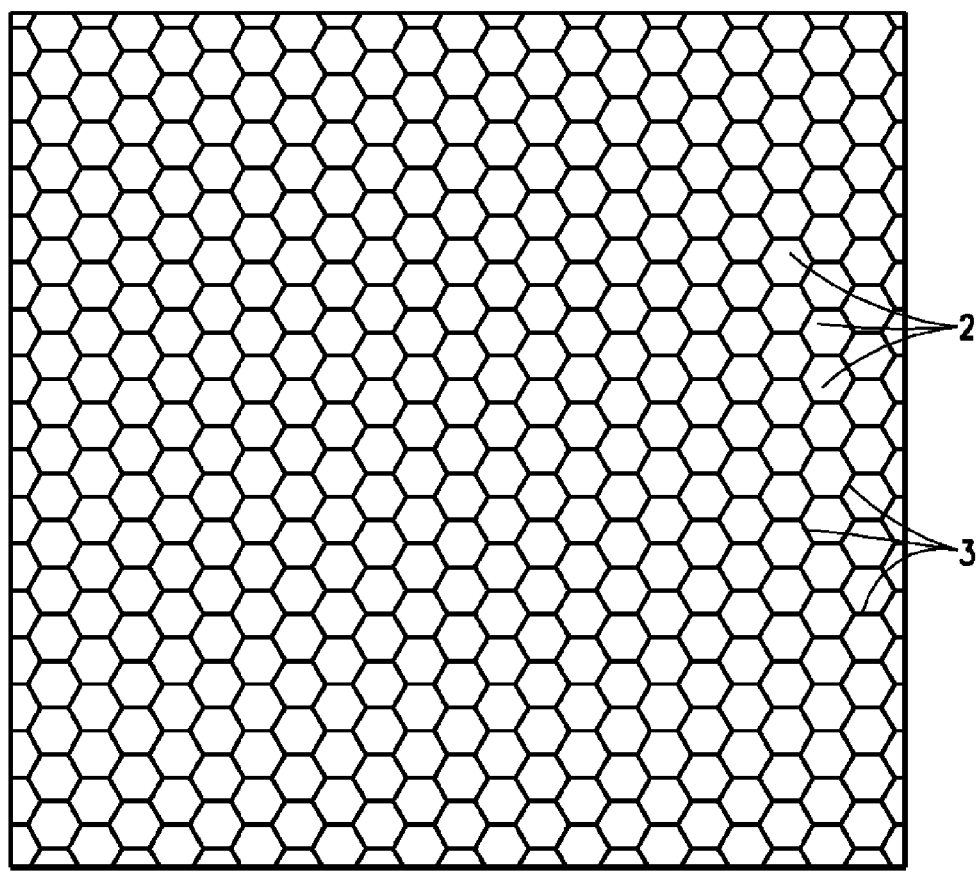
FIGS. 1a and 1b are representations of views of a hexagonal shaped honeycomb.
Figure 1B:
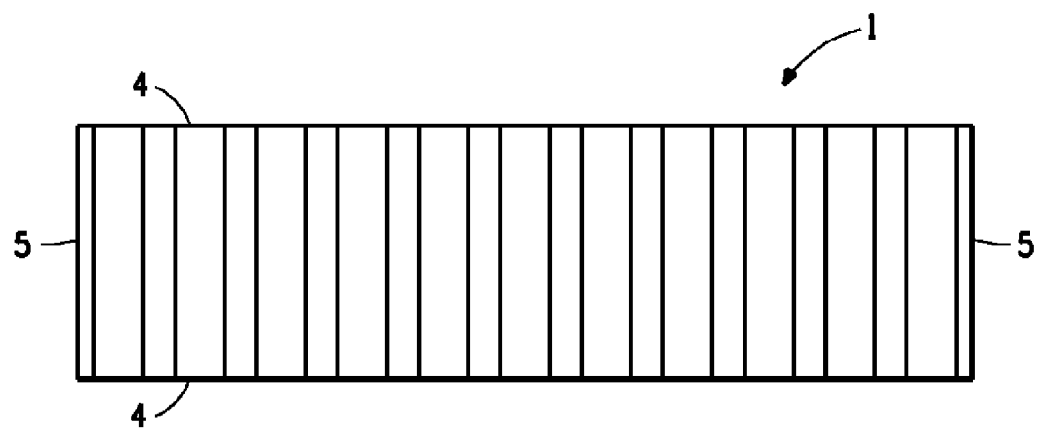
Figure 2:
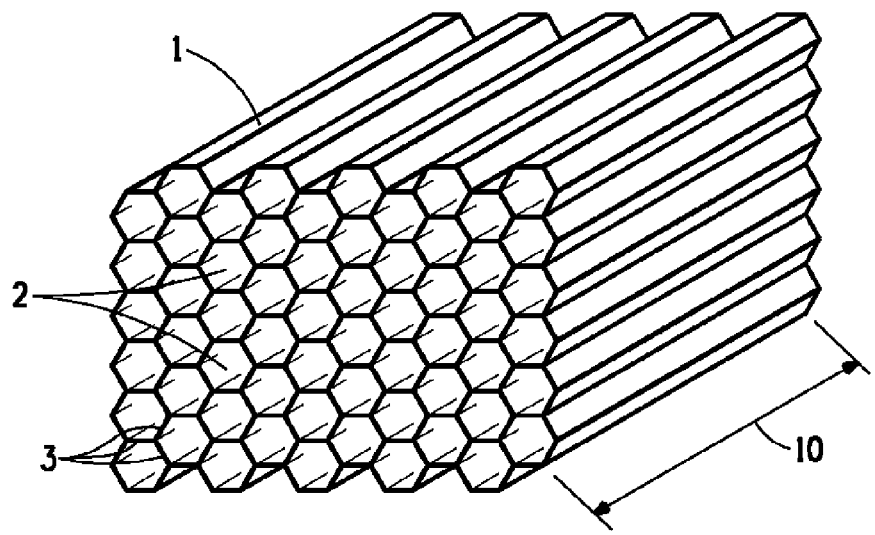
FIG. 2 is a representation of another view of a hexagonal cell shaped honeycomb.

FIG. 1a is a plan view illustration of one honeycomb 1 of this invention and shows cells 2 formed by cell walls 3. FIG. 1b is an elevation view of the honeycomb shown in FIG. 1a and shows the two exterior surfaces, or faces 4 formed at both ends of the cell walls. The core also has edges 5. FIG. 2 is a three-dimensional view of the honeycomb. Shown is honeycomb 1 having hexagonal cells 2 and cell walls 3. The "T" dimension or the thickness of the honeycomb is shown at 10 in FIG. 2. Hexagonal cells are shown; however, other geometric arrangements are possible with square, over-expanded and flex-core cells being among the most common possible arrangements. Such cell types are well known in the art and reference can be made to *Honeycomb Technology* by T. Bitzer (Chapman & Hall, publishers, 1997) for additional information on possible geometric cell types.

Figure 3:
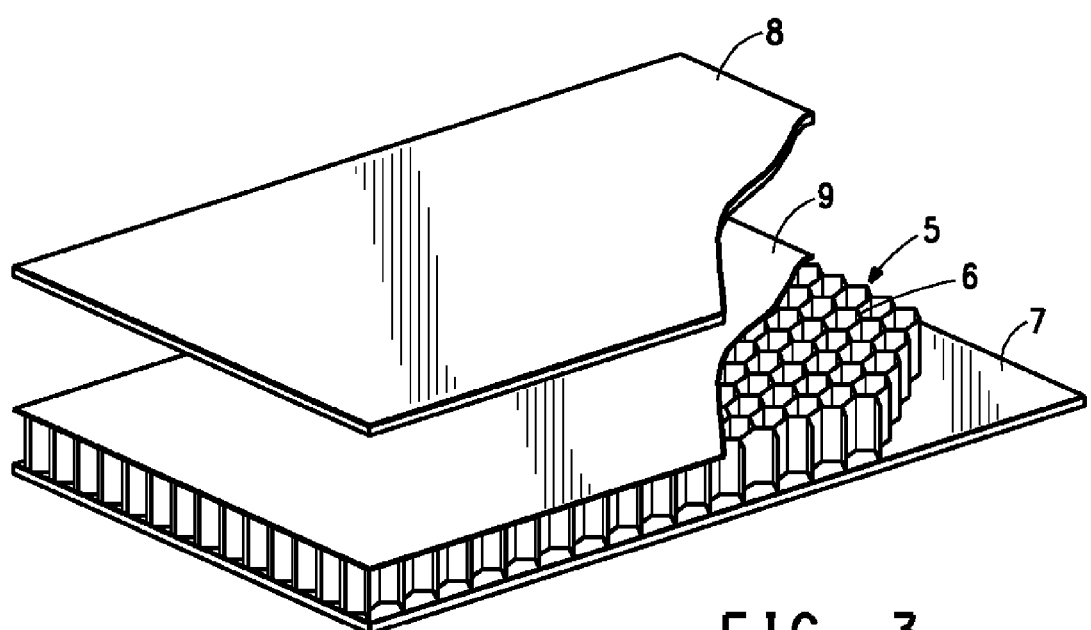
FIG. 3 is an illustration of honeycomb provided with facesheets.

FIG. 3 shows a structural sandwich panel 5 assembled from a honeycomb core 6 with face sheets 7 and 8, attached to the two exterior surfaces of the core. The preferred face sheet material is a prepreg, a fibrous sheet impregnated with thermoset or thermoplastic resin although metallic face sheets may also be utilized. With metallic face sheets, and in some circumstances with prepreg, an adhesive film 9 is also used. Normally there are at least two prepreg skins on either side of the core.

Processes for converting web substrates such as paper into honeycomb core are well known to those skilled in the art and include expansion and corrugation. The expansion process is particularly well suited for making core from paper. Such processes are further detailed on page 721 of the Engineered Materials Handbook, Volume 1—Composites, ASM International, 1988. The paper web can be coated with a matrix resin before or after formation of the honeycomb. Resin can be employed which is cross-linked after application to the paper to optimize final properties such as stiffness and strength. Examples of resins include epoxy, phenolic, acrylic, polyimide and mixtures thereof with phenolic being preferred. United States Military Specification MIL-R-9299C specifies appropriate resin properties. The final mechanical strength of core is result of a combination of several factors. The principal known contributors are paper composition and thickness, cell size, and final core density such as after coating with resin. Cell size is the diameter of an inscribed circle within the cell of a honeycomb core. For p-aramid core, typical cell sizes range from 1/8"-1/4" (3.2 mm-6.2 mm) but other sizes are possible. Typical final core densities are in the range of 38-96 kg/m$^3$.

For the same cell size, the same final core density and the same resin content, the core of the current invention has improved compression strength in comparison with other cores from p-aramid fiber papers known in the art.

Figure 4:
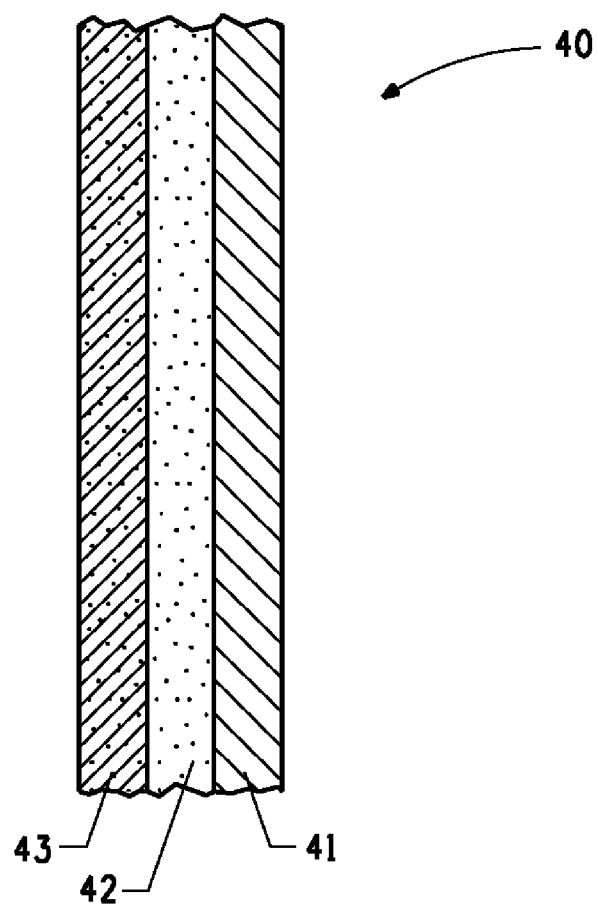
FIG. 4 shows a cross section through a honeycomb cell wall of this invention.

FIG. 4 shows generally at 40 a cross section through a honeycomb cell wall of this invention. The paper is shown at 41, the compression enhancement layer at 42 and the matrix resin coating at 43.

This concept is also applicable to other core structures such as folded core. Examples of folded core are described in U.S. Pat. Nos. 6,935,997 B2; 6,800,351 B1 and 6,913,570 B2.

Paper

The thickness of the paper used to make the core is dependent upon the end use or desired properties of the core structure and in some embodiments is from 0.6 to 20 mils (15 to 500 micrometers) thick. More preferably, the thickness is from 1.0 to 3.0 mils (25 to 75 micrometers). In some embodiments, the basis weight of the paper is from 0.5 to 6 ounces per square yard (15 to 200 grams per square meter).

In addition to p-aramid fibers, the paper of the core of this invention can also comprise, other fibers such as m-aramid, carbon, polybenzazole, polypyridazole, polyetherimide, polyphenylsulfone, liquid crystalline polyester. Further, the paper can include inorganic particles such as mica, vermiculite, and the like; the addition of these performance enhancing additives being to impart properties such as improved fire resistance, thermal conductivity, dimensional stability, and the like to the paper and the final core structure.

The paper used to make the honeycomb core of this invention can be formed on equipment of any scale, from laboratory screens to commercial-sized papermaking machinery, including such commonly used machines as Fourdrinier or inclined wire paper machines. A typical process involves making a dispersion of fibrous material such as floc and/or pulp and fibrids in an aqueous liquid, draining the liquid from the dispersion to yield a wet composition and drying the wet paper composition. The dispersion can be made either by dispersing the fibers and then adding the fibrids or by dispersing the fibrids and then adding the fibers. The final dispersion can also be made by combining a dispersion of fibers with a dispersion of the fibrids; the dispersion can optionally include other additives such as inorganic materials. The concentration of fibers from the floc and pulp in the dispersion can range from 0.01 to 1.0 weight percent based on the total weight of the dispersion. An example of a suitable range for fibrid concentration is that it should be equal to or less than 30 weight percent based on the total weight of solids. In a typical process, the aqueous liquid of the dispersion is generally water, but may include various other materials such as pH-adjusting materials, forming aids, surfactants, defoamers and the like. The aqueous liquid is usually drained from the dispersion by conducting the dispersion onto a screen or other perforated support, retaining the dispersed solids and then passing the liquid to yield a wet paper composition. The wet composition, once formed on the support, is usually further dewatered by vacuum or other pressure forces and further dried by evaporating the remaining liquid.

In one preferred embodiment, the fiber and the fibrids can be slurried together to form a mix that is converted to paper on a wire screen or belt. Reference is made to U.S. Pat. Nos. 4,698,267 and 4,729,921 to Tokarsky; 5,026,456 to Hesler et al.; 5,223,094 and 5,314,742 to Kirayoglu et al for illustrative processes for forming papers from aramid fibers and aramid fibrids.

Once the paper is formed, it is calendered to achieve the final desired density and thickness. An optional final step in the paper manufacturing can include a surface treatment of the paper in a corona or plasma atmosphere to further improve mechanical properties of the core structure.

Floc is generally made by cutting continuous spun filaments into specific-length pieces. Preferably, the floc length is from 2 to 25 millimeters. If the floc length is less than 2 millimeters, it is generally too short to provide a paper with adequate strength; if the floc length is more than 25 millimeters, it is very difficult to form uniform wet-laid webs. Floc having a diameter of less than 5 micrometers, and especially less than 3 micrometers, is difficult to produce with adequate cross sectional uniformity and reproducibility; if the floc diameter is more than 20 micrometers, it is very difficult to form uniform papers of light to medium basis weights.

Fibrids are typically made by streaming a polymer solution into a coagulating bath of liquid that is immiscible with the solvent of the solution. The stream of polymer solution is subjected to strenuous shearing forces and turbulence as the polymer is coagulated. The fibrid material of this invention can be selected from meta or para-aramid or blends thereof.

Aramid Fiber

P-aramid fiber in the paper of cell wall of the honeycomb of this invention can be in the form of the cut fiber (floc), in the form of the pulp or a blend thereof. Floc comprises short fibers made by cutting continuous filament fibers into short lengths without significant fibrillation. Short reinforcing fibers suitable for use in the present invention are those disclosed in U.S. Pat. No. 5,474,842 to Hoiness.

The term "pulp", as used herein, means particles of fibrous material having a stalk and fibrils extending generally therefrom, wherein the stalk is generally columnar and 10 to 50 micrometers in diameter and the fibrils are fine, hair-like members generally attached to the stalk measuring only a fraction of a micrometer or a few micrometers in diameter and 10 to 100 micrometers long.

The term "fibrids" as used herein, means a very finely-divided polymer product of small, filmy, essentially two-dimensional, particles known having a length and width of 100 to 1000 micrometers and a thickness of 0.1 to 1 micrometer.

As employed herein the term aramid means a polyamide wherein at least 85% of the amide (—CONH—) linkages are attached directly to two aromatic rings. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Para aramid fibers and various forms of these fibers are available from E. I. du Pont de Nemours and Company, Wilmington, Del. under the trademark Kevlar® and from Teijin, Ltd., under the trademark Twaron®.

Compression Enhancing Layer

The term "compression enhancement layer" as used herein, means any substance, which can be applied on the surface of the paper in any suitable quantity up to and including 5 weight percent of the paper weight. The material of the compression enhancement layer can be applied to the paper at any convenient stage in the honeycomb making process prior to applying the matrix resin coating. For example, in the case of an expansion process for making honeycomb, the compression enhancement layer can be applied to the paper prior to printing node lines. In the case of a corrugation process for making honeycomb, the compression enhancement layer can be applied to the paper prior to corrugation. In another alternative, the compression enhancement layer can be applied to the paper after the honeycomb shape has been formed irrespective of the honeycomb making process.

Any suitable material can be used for the compression enhancement layer depending on the paper composition, type of the matrix resin etc. One example of a suitable material is an epoxy coating based on glycerintriglycidylether. Another example is a polypeptide protein-carbon nanotube complex such as is described in PCT patent application publication WO2011/027342 to Wolf et al., or a polypeptide-graphite complex. Coupling agents and primers can also be used as compression enhancing layer materials in the current invention.

The compression enhancement layer can be applied in any suitable quantity from about 0.1% to about 5% of the weight of the paper, depending on the particular type of materials used in this layer.

Test Methods

Paper density was calculated using the paper thickness as measured based on ASTM D374-99 (Reapproved 2004) using a foot pressure of 0.9 kPa and the basis weight was measured by ASTM D646-96 (Reapproved 2001). Fiber denier is measured using ASTM D1907-07.

Gurley Porosity for papers was determined by measuring air resistance in seconds per 100 milliliters of cylinder displacement for 6.4 square centimeters circular area of a paper using a pressure differential of 1.22 kPa in accordance with TAPPI T460 om-96.

The density of the core was measured in accordance with ASTM C271/C271M-05 and the stabilized compression strength was measured in accordance with ASTM C365/C365M-05.

EXAMPLES

Example 1

A p-aramid fiber paper comprised of Kevlar® 49 floc and Nomex® fibrids was formed on conventional paper forming equipment. The composition of the paper was 60 weight % Kevlar® floc and 40 weight Nomex® fibrids. The Kevlar® floc had a nominal filament linear density of 1.5 denier per filament (1.7 dtex per filament) and a 6.4 mm cut length. The Nomex® fibrids were made as described in U.S. Pat. No. 3,756,908 to Gross.

The paper was then calendered under a linear pressure of 2600 N/cm at a temperature of 330° C. This produced the final paper with a thickness of 38 micrometers, a density of 0.75 g/cm$^3$ a basis weight of 0.9 oz/yd$^2$ (33.9 g/m$^2$), and Gurley air resistance of 700 seconds per 100 milliliters.

The paper was treated in-line with a water based emulsion comprising Denacol® EX-313 resin (glycerolpolyglycidylether), Aerosol OT, sodium carbonate, and soft water in amounts of 17.8, 0.11, 0.15 and 72 percent by weight respectively to form a compression enhancement layer. Denacol® EX-313 was supplied by Nagase ChemteX Corporation, Aerosol OT by Fitz Chem Corp., and sodium carbonate by Fisher Scientific (Chemicals Division). The total quantity of the compression enhancement layer was 1.2 weight percent based on the weight of the paper.

A honeycomb was then formed from the treated paper. Node lines of solvated adhesive were applied to the paper surface at a width of 2 mm and a pitch of 5 mm and the solvent removed.

The sheet with the adhesive node lines was cut into 500 mm lengths. A plurality of sheets were stacked one on top of the other, such that each of the sheets was shifted to the other by half a pitch or a half the interval of the applied adhesive node lines. The shift occurred alternately to one side or the other, so that the final stack is uniformly vertical. The number of stacked sheets was then hot-pressed between plates at the softening point of the adhesive, causing the adhesive node lines to flow. Once the heat was removed the adhesive hardened to bond adjacent sheets to each other. The bonded aramid paper sheets were then expanded in the direction counter to the stacking direction to form cells having an equilateral cross section. Each of the sheets were extended between each other such that the sheets were folded along the edges of the bonded node lines and the portions not bonded were extended in the direction of the tensile force to separate the sheets from each other. A frame was used to expand and hold the honeycomb in the expanded shape. The expanded cell size was 3.2 mm.

The expanded honeycomb was then placed in a bath containing solvent-based MIL-R-9299C standard phenolic resin. The phenolic resin was used in a liquid form wherein the resin was dissolved in ethanol. The resin adhered to and coated the interior surface of the cell walls as well as penetrating into the pores of the paper. After impregnating with resin, the honeycomb was taken out from the bath and was dried in a drying furnace by hot air to remove the solvent and cure the phenolic resin. The impregnation step in the resin bath and the drying step in the drying furnace were repeated a further two times. The honeycomb core had properties as shown in Table 1.

Comparative Example 1

A p-aramid fiber paper comprised of Kevlar® 49 floc and Nomex® fibrids was formed on conventional paper forming equipment. The composition of the paper was 73 weight % Kevlar® floc and 27 weight Nomex® fibrids. The Kevlar® floc had a nominal filament linear density of 1.5 denier per filament (1.7 dtex per filament) and a 6.4 mm cut length. The Nomex® fibrids were made as described in U.S. Pat. No. 3,756,908 to Gross. The paper was then calendered under a linear pressure of 2600 N/cm at a temperature of 330° C. This produced the final paper with a thickness of 38 micrometers, a density of 0.75 g/cm$^3$ a basis weight of 0.9 oz/yd$^2$ (33.9 g/m$^2$), and Gurley air resistance of 15 seconds per 100 milliliters. The paper was treated in-line to form a compression enhancement layer as in Example 1.

A honeycomb was then formed from the treated paper in the same way as described in Example 1. The core had properties as shown in Table 1.

Comparative Example 2

The paper and honeycomb was prepared as in Example 1 with the exception that there was no compression enhancement layer. The core had properties as shown in Table 1.

As can be seen from the data of Table 1 and FIG. 4, for the same core density, the honeycomb core of this invention has surprisingly higher compression strength in comparison with the cores from the both comparative examples.

Example 2

The paper was made as in Example 1 with the exception that it was calendered to higher density of 0.85 g/cm$^3$. A compression enhancement layer was coated onto the paper as in Example 1 and a honeycomb core made as previously described. The properties of this core are also shown in Table 1.

TABLE 1

|  | Example 1 | Comparative 1 | Comparative 2 | Example 2 |
|---|---|---|---|---|
| Paper Basis Weight (g/m$^2$) | 33.9 | 33.9 | 33.9 | 33.9 |
| Paper density, g/cm3 | 0.75 | 0.75 | 0.75 | 0.85 |
| Paper Gurley Air Resistance (seconds/100 ml) | 700 | 15 | 700 | 1500 |
| Compression enhancement layer present | Yes | Yes | No | Yes |
| Honeycomb Cell Size, (mm) | 3.2 | 3.2 | 3.2 | 3.2 |
| Core Density (kg/m$^3$) | 40 | 40 | 40 | 40 |
| Stabilized Compression Strength of the Honeycomb Core (MPa) | 2.14 | 1.65 | 1.70 | 2.30 |

As can be seen from the data in Table 1, to get a significant improvement in compression strength of the honeycomb core from a p-aramid paper, it is insufficient to use a paper with correct level of Gurley air resistance (Comparative Example 2) or to use a paper having a compression enhancement layer (Comparative Example 1). Only the combination of both the features of the correct right level of Gurley air resistance and a compression enhancement layer as in Examples 1 and 2 provides a significant improvement in compression strength, in this case about 20 and 35 percent respectively.

What is claimed:

1. A honeycomb comprising in order
   (i) a paper sheet, the sheet comprising meta-aramid fibrids, para-aramid fibrids or a combination thereof,
   (ii) a compression enhancing layer comprising glycerol-polyglycidylether, a polypeptide-carbon nanotube complex, a polypeptide-graphite complex or combinations thereof deposited onto both outer surfaces of the paper sheet in a quantity up to 5 weight percent based on the weight of the paper, and
   (iii) a matrix resin coating resin coated onto the surface of the compression enhancing layer, wherein the matrix coating resin is phenolic, polyimide, polyetherimide, epoxy or combinations thereof.

* * * * *